US012658721B2

(12) United States Patent
Syouda

(10) Patent No.: US 12,658,721 B2
(45) Date of Patent: Jun. 16, 2026

(54) POWER STORAGE SYSTEM

(71) Applicant: YAZAKI CORPORATION, Tokyo (JP)

(72) Inventor: Takahiro Syouda, Susono (JP)

(73) Assignee: YAZAKI CORPORATION, Tokyo (JP)

( * ) Notice: Subject to any disclaimer, the term of this patent is extended or adjusted under 35 U.S.C. 154(b) by 584 days.

(21) Appl. No.: 18/356,135

(22) Filed: Jul. 20, 2023

(65) Prior Publication Data

US 2024/0047978 A1 Feb. 8, 2024

(30) Foreign Application Priority Data

Aug. 8, 2022 (JP) ................................. 2022-126376

(51) Int. Cl.
*H01M 10/46* (2006.01)
*H02J 7/34* (2006.01)
*H02J 7/54* (2026.01)
*H02J 7/96* (2026.01)

(52) U.S. Cl.
CPC ................ *H02J 7/54* (2026.01); *H02J 7/342* (2020.01); *H02J 7/96* (2026.01)

(58) Field of Classification Search
CPC ...... H02J 7/54; H02J 7/96; H02J 7/342; H02J 7/56
USPC ........ 320/103, 107, 114, 115, 116, 117, 119, 320/132
See application file for complete search history.

(56) References Cited

U.S. PATENT DOCUMENTS

2011/0089897 A1* 4/2011 Zhang ....................... H02J 7/54
                                                        320/116
2012/0223677 A1 9/2012 Yamauchi et al.
2018/0099579 A1* 4/2018 Hale ....................... H02J 7/585

FOREIGN PATENT DOCUMENTS

JP          2012-182911 A    9/2012
JP          2013-31249 A     2/2013
JP          2013-90525 A     5/2013
KR            101614046 B1 * 4/2016   ................ H02J 7/52

OTHER PUBLICATIONS

Machine translation of KR20150050216A (Aug. 5, 2015) (Year: 2015).*

* cited by examiner

*Primary Examiner* — Edward Tso
(74) *Attorney, Agent, or Firm* — KENEALY VAIDYA LLP

(57) ABSTRACT

A power storage system includes a plurality of storage battery units connected in series, and a plurality of bypass circuits respectively provided for the storage battery units and each configured to switch the corresponding storage battery unit between a bypass state and a connection state. Each of the storage battery units includes a plurality of storage battery modules connected in series, and each of the storage battery modules includes a plurality of storage battery cells connected in series. The storage battery modules are respectively provided with inter-cell balancing units each configured to execute cell balancing for equalizing voltages of the storage battery cells in the corresponding storage battery module, and the storage battery units are respectively provided with inter-module balancing units each configured to execute module balancing for equalizing voltages of the storage battery modules in the corresponding storage battery unit.

6 Claims, 3 Drawing Sheets

POWER STORAGE SYSTEM

CROSS-REFERENCE TO RELATED APPLICATIONS

This application is based on and claims priority under 35 USC 119 from Japanese Patent Application No. 2022-126376 filed on Aug. 8, 2022, the contents of which are incorporated herein by reference.

TECHNICAL FIELD

The present disclosure relates to a power storage system.

BACKGROUND ART

As a power storage system that controls charging of a storage battery string in which a plurality of storage battery modules are connected in series, a power storage system including a bypass mechanism for each of storage battery modules is known as disclosed in, for example, JP2013-031249A. The bypass mechanism includes a first switch that connects the storage battery modules to each other in series and a second switch that is located on a bypass line for bypassing the storage battery modules. In the power storage system, the bypass mechanism is controlled according to a result of a state estimation of the storage battery module.

In the power storage system described in JP2013-031249A, when the number of connected storage battery modules increases in order to increase a voltage of the storage battery string, the number of bypass mechanisms increases in proportion thereto. Here, it is conceivable to provide a plurality of storage battery modules with respect to one bypass mechanism, so as to prevent an increase in the number of bypass mechanisms associated with an increase in the number of connected storage battery modules. However, in this case, when there is a difference in the deterioration state among the plurality of storage battery modules corresponding to each bypass mechanism, the storage battery module having fast deterioration progress reaches full charge or full discharge earlier. Accordingly, the plurality of storage battery modules including the corresponding storage battery module are bypassed by the bypass mechanism in a state where each of the storage battery modules other than the storage battery module has a surplus battery capacity. Therefore, a usable battery capacity of the storage battery string cannot be increased by an amount corresponding to the increase in the number of connected storage battery modules.

The present disclosure provides a power storage system in which an increase in the number of bypass mechanisms associated with an increase in the number of connected storage battery modules can be prevented and a usable battery capacity of a storage battery string can be increased corresponding to the increase in the number of connected storage battery modules.

SUMMARY OF INVENTION

The present disclosure relates a power storage system includes a plurality of storage battery units connected in series, and a plurality of bypass circuits respectively provided for the storage battery units and each configured to switch the corresponding storage battery unit between a bypass state and a connection state. Each of the storage battery units includes a plurality of storage battery modules connected in series, and each of the storage battery modules includes a plurality of storage battery cells connected in series. The storage battery modules are respectively provided with inter-cell balancing units each configured to execute cell balancing for equalizing voltages of the plurality of storage battery cells in the corresponding storage battery module, and the storage battery units are respectively provided with inter-module balancing units each configured to execute module balancing for equalizing voltages of the plurality of storage battery modules in the corresponding storage battery unit.

DESCRIPTION OF EMBODIMENTS

Figure 1:
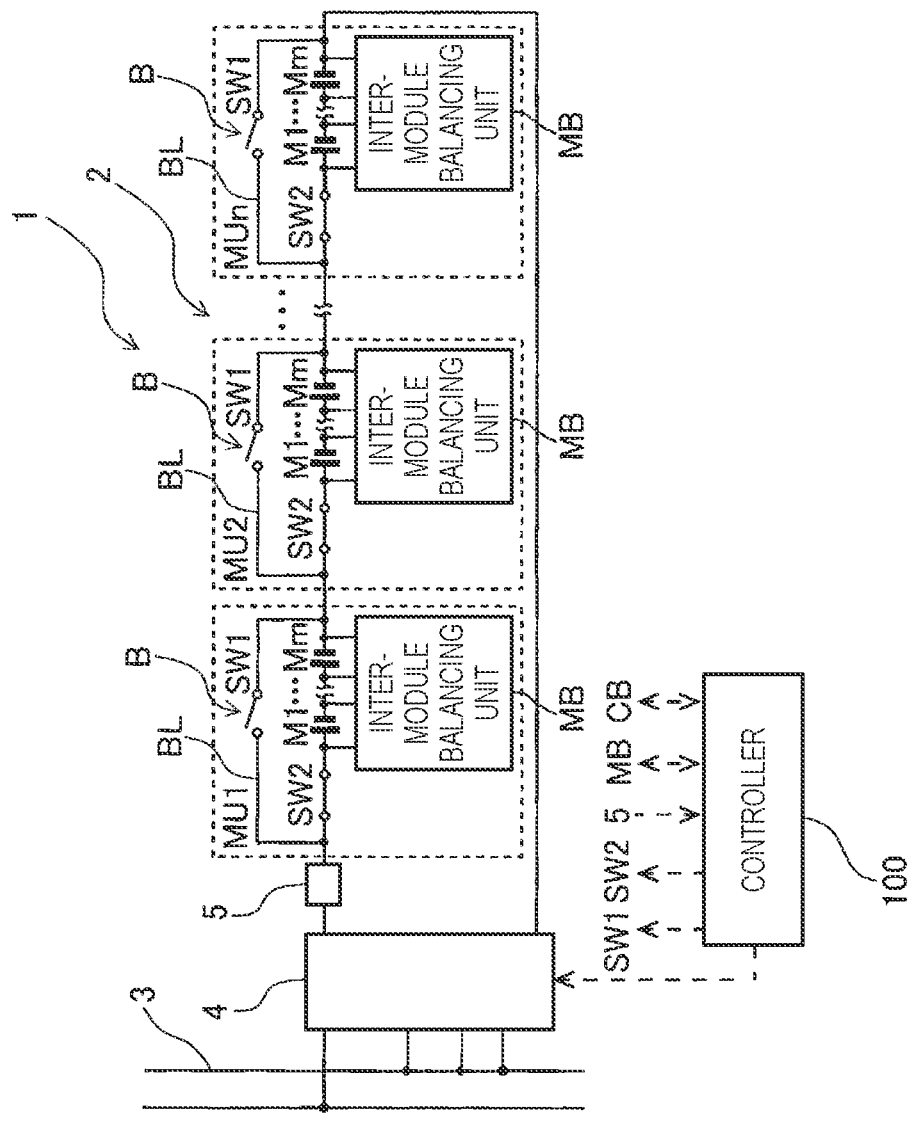
FIG. 1 is a circuit diagram schematically showing a power storage system according to an embodiment of the present disclosure.

Hereinafter, the present disclosure will be described with reference to preferred embodiments. The present disclosure is not limited to the embodiments to be described below, and the embodiments can be appropriately modified without departing from the scope of the present disclosure. In the embodiments to be described below, a part of configurations may be not described or shown in the drawings, and regarding details of the omitted techniques, publicly known or well-known techniques will be appropriately applied as long as there is no contradiction with the contents to be described below.

FIG. 1 is a circuit diagram schematically showing a power storage system 1 according to an embodiment of the present disclosure. As shown in FIG. 1, the power storage system 1 includes one or a plurality of storage battery strings 2, a string bus 3, one or a plurality of power converters 4, a current sensor 5, and a controller 100. The storage battery string 2 is connected to an external system (not shown) via the power converter 4 and the string bus 3. The power storage system 1 is a stationary or in-vehicle power supply.

The storage battery string 2 includes n (n is an integer of 2 or more) storage battery module units MU1 to MUn connected in series, n bypass circuits B, and n inter-module balancing units MB. The bypass circuit B and the inter-module balancing unit MB are provided for each of the storage battery module units MU1 to MUn.

Each of the storage battery module units MU1 to MUn includes m (m is an integer of 2 or more) storage battery modules M1 to Mm connected in series. Although not particularly limited, the storage battery modules M1 to Mm of the present embodiment are obtained by regenerating used power storage batteries, and there is a difference in the degree of deterioration or performance among the storage battery modules M1 to Mm. The storage battery modules M1 to Mm are secondary batteries such as lithium ion batteries and lithium ion capacitors.

The storage battery module units MU1 to MUn are charged when being supplied with power from the external system through the string bus 3 and the power converter 4, and supply the charged power to the external system through the power converter 4 and the string bus 3 when being discharged.

The external system includes a load, a power generator, and the like. When the power storage system 1 is a stationary power storage system, home appliances, commercial power supply systems, liquid crystal indicators, communication modules, and the like serve as loads, and a solar photovoltaic power generation system or the like serves as a power generator. On the other hand, when the power storage system 1 is an in-vehicle power storage system, a driving motor, an air conditioner, various in-vehicle electrical components, and the like serve as loads. The driving motor serves as both a load and a power generator.

The power converter 4 is a DC/DC converter or a DC/AC converter, and is connected to the string bus 3. Further, a positive electrode of the storage battery module unit MU1 at the one end and a negative electrode of the storage battery module unit MUn at the other end are connected to the power converter 4.

When the storage battery string 2 is charged, the power converter 4 converts a voltage input from the string bus 3 and outputs the converted voltage to the plurality of storage battery module units MU1 to MUn. On the other hand, when the storage battery string 2 is discharged, the power converter 4 converts the voltages input from the plurality of storage battery module units MU1 to MUn and outputs the converted voltages to the string bus 3. When a current flowing through the string bus 3 is a direct current, the power converter 4 is a DC/DC converter, and when the current flowing through the string bus 3 is an alternating current, the power converter 4 is a DC/AC converter. When the current flowing through the string bus 3 is an alternating current, the power converter 4 includes synchronization means for following a change in an instantaneous value.

The current sensor 5 is provided in a current path of the storage battery string 2. The current sensor 5 measures a charge/discharge current of the storage battery string 2.

The bypass circuit B includes a bypass line BL and switches SW1, SW2. The bypass line BL is a power line for bypassing the plurality of storage battery modules M1 to Mm in each of the storage battery module units MU1 to MUn. The switch SW1 is provided in the bypass line BL. The switch SW1 is, for example, a semiconductor switch or a mechanical relay. The switch SW2 is provided between the positive electrode of the storage battery module M1 at the start and one end of the bypass line BL. The switch SW2 is, for example, a semiconductor switch or a mechanical relay. The switch SW2 is connected in series to the plurality of storage battery modules M1 to Mm, and the switch SW1 is connected in parallel to the plurality of storage battery modules M1 to Mm and the switch SW2.

The storage battery module unit MU1 at the one end and the storage battery module unit MUn at the other end are connected to the external system via the power converter 4 and the string bus 3. When the switch SW1 is turned off and the switch SW2 is turned on in all the bypass circuits B, all the storage battery module units MU1 to MUn are connected in series to the external system. On the other hand, when the switch SW2 is turned off and the switch SW1 is turned on in a certain one of the bypass circuits B, one of the storage battery module units MU1 to MUn corresponding to the bypass circuit B is bypassed.

In each of the storage battery module units MU1 to MUn, the inter-module balancing unit MB executes module balancing for equalizing voltages (hereinafter, referred to as module voltages) of the plurality of storage battery modules M1 to Mm. Details of the module balancing executed by the inter-module balancing unit MB will be described later.

The controller 100 executes monitoring of each of the storage battery module units MU1 to MUn, cooperative control on the inter-module balancing unit MB and an inter-cell balancing unit CB (see FIG. 2) to be described later, and charge and discharge control by the power converter 4. During discharging of the power storage system 1, a total voltage of the storage battery string 2 fluctuates according to a state of charge (SOC) and a bypass state (the number of connected storage battery module units MU1 to MUn) of each of the storage battery module units MU1 to MUn. Therefore, when there are a plurality of storage battery strings 2, the power converter 4 adjusts output voltages of the respective storage battery strings 2 such that the total voltages of the plurality of storage battery strings 2 to be discharged match. On the other hand, during the charging of the power storage system 1, the total voltage of the storage battery string 2 fluctuates according to the SOC or the bypass state of each of the storage battery module units MU1 to MUn. Therefore, the power converter 4 adjusts the voltage received from the string bus 3 to the total voltage of the corresponding storage battery string 2. That is, the controller 100 controls the power converter 4 according to a level of the total voltage of each of the storage battery strings 2.

Figure 2:
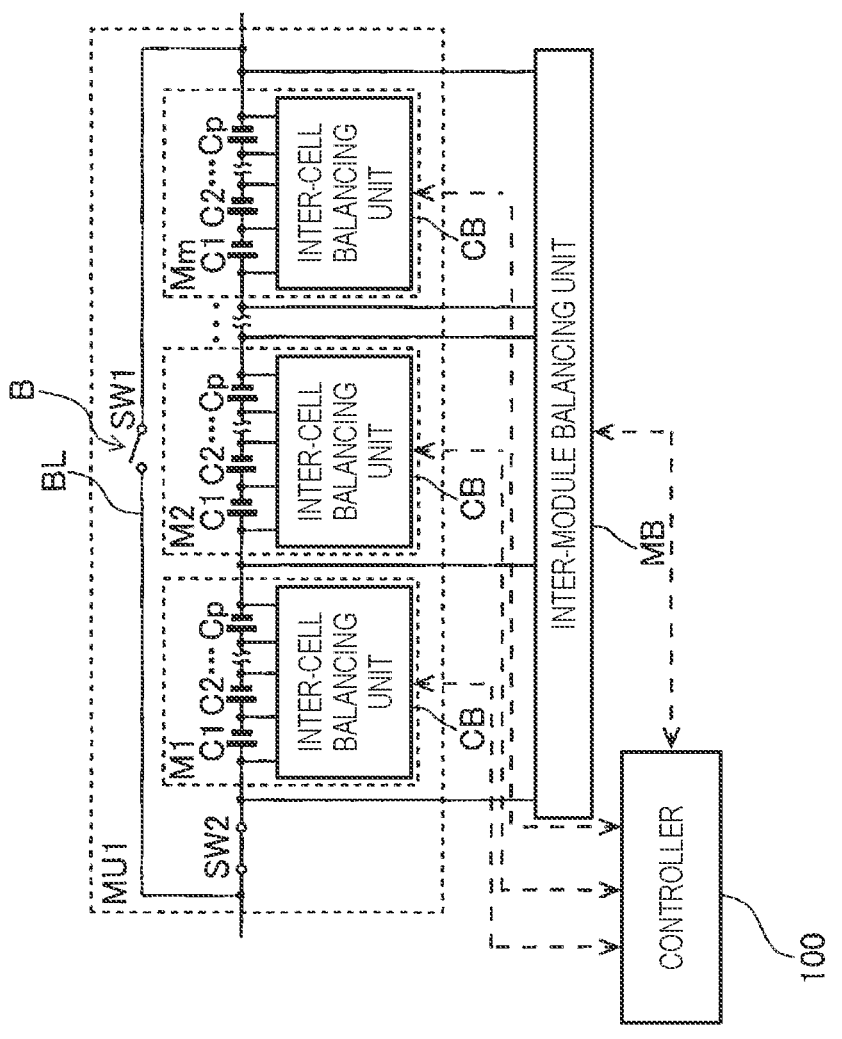
FIG. 2 is a circuit diagram schematically showing a storage battery module unit.

FIG. 2 is a circuit diagram schematically showing the storage battery module unit MU1. The storage battery module unit MU1 will be described, and all of the storage battery module units MU1 to MUn have the same configuration.

As shown in FIG. 2, the storage battery module unit MU1 includes m storage battery modules M1 to Mm connected in series and m inter-cell balancing units CB. Each of the storage battery modules M1 to Mm includes p (p is an integer of 2 or more) storage battery cells C1 to Cp connected in series. The inter-cell balancing unit CB is provided for each of the storage battery modules M1 to Mm, and executes cell balancing for equalizing voltages (hereinafter, referred to as cell voltages) of the storage battery cells C1 to Cp in each of the storage battery modules M1 to Mm.

The inter-cell balancing unit CB includes a cell balancing circuit (not shown) that realizes cell balancing for equalizing the cell voltages of the plurality of storage battery cells C1 to Cp. There are passive cell balancing circuits and active cell balancing circuits.

The passive cell balancing circuit includes a discharge resistor and a switch for each of the storage battery cells C1 to Cp. The discharge resistor and the switch are connected in parallel to each of the storage battery cells C1 to Cp. In the passive cell balancing circuit, the cell voltage is monitored by a comparator, and when a relatively high cell voltage reaches a cell balancing detection voltage, the corresponding switch is turned on. As a result, a corresponding storage battery cell among the storage battery cells C1 to Cp is bypassed and a charge current (surplus current) therein is consumed by the discharge resistor, thus an increase in the cell voltage of the corresponding storage battery cell among the storage battery cells C1 to Cp is prevented, and a difference (unbalance) in the cell voltage between the corresponding storage battery cell among the storage battery cells C1 to Cp and others among the storage battery cells C1 to Cp is reduced. Accordingly, charging of each of the storage battery modules M1 to Mm is continued until all the storage battery cells C1 to Cp in each of the storage battery modules M1 to Mm are completely charged.

The active cell balancing circuits are classified into string-to-cell type cell balancing circuits and cell-to-cell type cell balancing circuits. The string-to-cell type cell balancing circuit and the cell-to-cell type cell balancing circuit are both cell balancing circuits of a type in which power of the storage battery cells C1 to Cp connected in series is redistributed to those among the storage battery cells C1 to Cp having low cell voltages. The cell-to-cell type cell balancing circuits are further classified into an adjacent cells type and a cell selection type. In the active cell balancing circuit, for example, when a difference between a maximum value and a minimum value of the cell voltage exceeds a threshold value, power is transmitted from one of the storage battery cells C1 to Cp having the maximum cell voltage to one of the storage battery cells C1 to Cp having the minimum cell voltage. Accordingly, a difference in the cell voltage among all the storage battery cells C1 to Cp in each of the storage battery modules M1 to Mm is reduced, and charging or discharging of each of the storage battery modules M1 to Mm is continued until all the storage battery cells C1 to Cp in each of the storage battery modules M1 to Mm are completely charged or discharged.

Each of the storage battery modules M1 to Mm has the storage battery cells C1 to Cp having different deterioration states and performances. However, since the difference in the cell voltage among the storage battery cells C1 to Cp in each of the storage battery modules M1 to Mm is required to be controlled to an allowable range corresponding to performances of the cell balancing circuits, the difference in the deterioration state or the performance among the storage battery cells C1 to Cp in each of the storage battery modules M1 to Mm is controlled to the allowable range corresponding to the performances of the cell balancing circuits.

As described above, the inter-module balancing unit MB is provided for each of the storage battery module units MU1 to MUn. The inter-module balancing unit MB executes the module balancing for equalizing voltages (hereinafter, referred to as module voltages) of the storage battery modules M1 to Mm in each of the storage battery module units MU1 to MUn.

The inter-module balancing unit MB includes a module balancing circuit (not shown) that realizes the module balancing for equalizing the module voltages of the plurality of storage battery modules M1 to Mm. There are passive module balancing circuits and active module balancing circuits.

The passive module balancing circuit includes a discharge resistor and a switch for each of the storage battery modules M1 to Mm. The discharge resistor and the switch are connected in parallel to the each of storage battery modules M1 to Mm. In the passive module balancing circuit, the module voltage is monitored by a comparator, and when a relatively high module voltage reaches a module balancing detection voltage, the corresponding switch is turned on. As a result, a corresponding storage battery module among the storage battery modules M1 to Mm is bypassed and a charge current (surplus current) therein is consumed by the discharge resistor, thus an increase in the voltage of the corresponding storage battery module among the storage battery modules M1 to Mm is prevented, and a difference in the module voltage between the corresponding storage battery module among the storage battery modules M1 to Mm and others among the storage battery module M1 to Mm is reduced. Accordingly, charging of each of the storage battery module units MU1 to MUn is continued until all the storage battery modules M1 to Mm in each of the storage battery module units MU1 to MUn are completely charged.

The active module balancing circuits are classified into string-to-cell type module balancing circuits and cell-to-cell type module balancing circuits, similarly to the active cell balancing circuits. The string-to-cell type module balancing circuit and the cell-to-cell type module balancing circuit are both module balancing circuits of a type in which power of the storage battery modules M1 to Mm connected in series is redistributed to those among the storage battery modules M1 to Mm having low module voltages. The cell-to-cell type cell balancing circuits are further classified into an adjacent cells type and a cell selection type. In the active module balancing circuit, for example, when a difference between a maximum value and a minimum value of the module voltage exceeds a threshold value, power is transmitted from one of the storage battery modules M1 to Mm having the maximum module voltage to one of the storage battery modules M1 to Mm having the minimum module voltage. Accordingly, a difference in the module voltage among all the storage battery modules M1 to Mm in each of the storage battery module units MU1 to MUn is reduced, and charging or discharging of each of the storage battery module units MU1 to MUn is continued until all the storage battery modules M1 to Mm in each of the storage battery module units MU1 to MUn are completely charged or discharged.

Each of the storage battery module units MU1 to MUn has the storage battery modules M1 to Mm having different deterioration states and performances. However, since the difference in the module voltage among the storage battery modules M1 to Mm in each of the storage battery module units MU1 to MUn is required to be controlled to an allowable range corresponding to performances of the module balancing circuits, the difference in the deterioration state or the performance among the storage battery modules M1 to Mm in each of the storage battery module units MU1 to MUn is controlled to an allowable range corresponding to the performances of the module balancing circuits.

During charging of the power storage system 1 (see FIG. 1), the SOCs of the storage battery module units MU1 to MUn increase, and one of the most deteriorated storage battery module units MU1 to MUn (or having the lowest charging capacity) is the earliest to be fully charged. The corresponding storage battery module unit among the storage battery module units MU1 to MUn is bypassed by the bypass circuit B. Thereafter, others among the storage battery module units MU1 to MUn are also fully charged sequentially and are bypassed to the respective bypass circuits B. In this process, the module voltages of the storage battery modules M1 to Mm in each of the storage battery module units MU1 to MUn are further equalized by the inter-module balancing units MB. Therefore, even when there is a difference in the deterioration state or the performance among the storage battery modules M1 to Mm in each of the storage battery module units MU1 to MUn, all the storage battery modules M1 to Mm are fully charged.

On the other hand, during discharging of the power storage system 1, the SOCs of the storage battery module units MU1 to MUn decrease, and one of the most deteriorated storage battery module units MU1 to MUn (or having the lowest discharge capacity) is the earliest to be fully discharged. The corresponding storage battery module unit among the storage battery module units MU1 to MUn is bypassed by the bypass circuit B. Thereafter, others among the storage battery module units MU1 to MUn are also fully discharged sequentially and are bypassed by the respective bypass circuits B. In this process, the module voltages of the storage battery modules M1 to Mm in each of the storage battery module units MU1 to MUn are further equalized by the inter-module balancing units MB. Therefore, even when there is a difference in the deterioration state or the performance among the storage battery modules M1 to Mm in each of the storage battery module units MU1 to MUn, all the storage battery modules M1 to Mm are fully discharged.

Here, when the module balancing circuit of the inter-module balancing unit MB is an active module balancing circuit, cooperative control of the inter-cell balancing unit CB and the inter-module balancing unit MB is required. For example, when power is transmitted to one of the storage battery modules M1 to Mm, in which one of the storage battery cells C1 to Cp having reached a charge termination voltage is included, from another of the storage battery modules M1 to Mm, the corresponding one of the storage battery cells C1 to Cp having reached the charge termination voltage is over-charged. On the other hand, when power is transmitted from one of the storage battery modules M1 to Mm, in which one of the storage battery cells C1 to Cp having reached a discharge termination voltage is included, to another of the storage battery modules M1 to Mm, the corresponding one of the storage battery cells C1 to Cp having reached the discharge termination voltage is over-discharged.

Further, when power is transmitted to one of the storage battery modules M1 to Mm whose input current is limited from another of the storage battery modules M1 to Mm, a current exceeding a limit value may be input to the one of the storage battery modules M1 to Mm. On the other hand, when power is transmitted from one of the storage battery modules M1 to Mm whose output current is limited to another of the storage battery modules M1 to Mm, a current exceeding a limit value may be output from the one of the storage battery modules M1 to Mm.

When the module balancing circuit of the inter-module balancing unit MB is in an active module balancing circuit, the controller 100 executes cooperative control on the inter-cell balancing unit CB and the inter-module balancing unit MB. Accordingly, over-charge or over-discharge of the storage battery cells C1 to Cp, and input/output of power exceeding the limit value of the storage battery modules M1 to Mm, which occurs during the module balancing, are prevented. Hereinafter, the cooperative control of the controller 100 on the inter-cell balancing unit CB and the inter-module balancing unit MB will be described.

Figure 3:
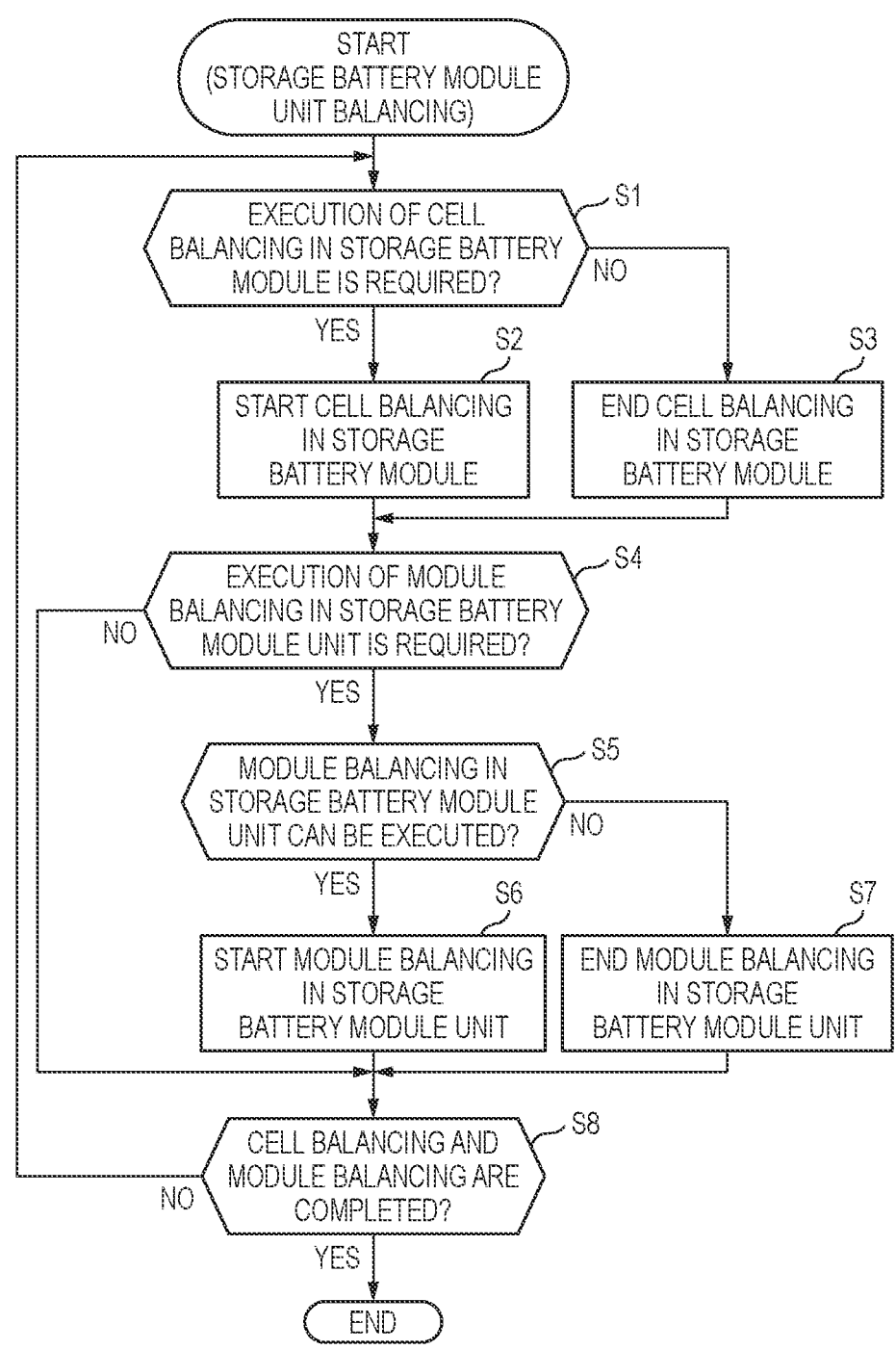
FIG. 3 is a flowchart illustrating cooperative control of a controller on an inter-cell balancing unit and an inter-module balancing unit.

FIG. 3 is a flowchart illustrating the cooperative control of the controller 100 on the inter-cell balancing unit CB and the inter-module balancing unit MB. The process shown in the flowchart is started together with the start of state estimations of the storage battery module units MU1 to MUn, the storage battery modules M1 to Mm, and the storage battery cells C1 to Cp when the charging or discharging of the storage battery string 2 is started.

First, in step S1, the inter-cell balancing unit CB determines whether execution of the cell balancing in each of the storage battery modules M1 to Mm is required based on the cell voltages of the storage battery cells C1 to Cp in each of the storage battery modules M1 to Mm. For example, when the cell balancing circuit is a passive cell balancing circuit, the inter-cell balancing unit CB determines whether the cell voltages of the storage battery cells C1 to Cp have reached the cell balancing detection voltage. On the other hand, when the cell balancing circuit is an active cell balancing circuit, the inter-cell balancing unit CB determines whether the difference between the maximum value and the minimum value of the cell voltages of the storage battery cells C1 to Cp is equal to or less than the threshold value. If the determination is yes in step S1, the process proceeds to step S2, and if the determination is no in step S1, the process proceeds to step S3.

In step S2, the inter-cell balancing unit CB starts the cell balancing of the corresponding storage battery modules among the storage battery modules M1 to Mm. On the other hand, in step S3, the inter-cell balancing unit CB ends the cell balancing of the corresponding storage battery modules among the storage battery modules M1 to Mm. The end of the cell balancing of the storage battery modules M1 to Mm in step S3 includes a case where the cell balancing of the storage battery modules M1 to Mm is ended without being started. The process proceeds from step S2 and step S3 to step S4.

In step S4, the inter-module balancing unit MB determines whether execution of the module balancing in each of the storage battery module units MU1 to MUn is required based on the module voltages of the storage battery modules M1 to Mm in each of the storage battery module units MU1 to MUn. For example, the inter-module balancing unit MB determines whether the difference between the maximum value and the minimum value of the module voltages of the storage battery modules M1 to Mm is equal to or less than the threshold value. If the determination is yes in step S4, the process proceeds to step S5, and if the determination is no in step S4, the process proceeds to step S8.

In step S5, the controller 100 determines whether the module balancing can be executed for one of the storage battery module units MU1 to MUn which is determined to require the module balancing. For example, the controller 100 determines whether one of the storage battery cells C1 to Cp having reached the charge termination voltage is included in one of the storage battery modules M1 to Mm having the minimum module voltage in each of the storage battery module units MU1 to MUn. When one of the storage battery cells C1 to Cp having reached the charge termination voltage is included one of the storage battery modules M1 to Mm having the minimum module voltage in each of the storage battery module units MU1 to MUn, the controller 100 determines that the module balancing to the storage battery module cannot be executed. On the other hand, the controller 100 determines whether one of the storage battery cells C1 to Cp having reached the discharge termination voltage is included in one of the storage battery modules M1 to Mm having the maximum module voltage in each of the storage battery module units MU1 to MUn. When one of the storage battery cells C1 to Cp having reached the discharge termination voltage is included in one of the storage battery modules M1 to Mm having the maximum module voltage in each of the storage battery module units MU1 to MUn, the controller 100 determines that the module balancing from the storage battery module cannot be executed.

Further, the controller 100 determines whether an input current or an input power is equal to or higher than a limit value for one of the storage battery modules M1 to Mm having the minimum module voltage in each of the storage battery module units MU1 to MUn. When the input current or the input power of the one of the storage battery modules M1 to Mm is equal to or higher than the limit value, the controller 100 determines that the module balancing to the storage battery module cannot be executed. On the other hand, the controller 100 determines whether an output current or an output power is equal to or higher than a limit value for one of the storage battery modules M1 to Mm having the maximum module voltage in each of the storage battery module units MU1 to MUn. When the output current or the output power of the corresponding one of the storage battery modules M1 to Mm is equal to or higher than the limit value, the controller 100 determines that the module balancing from the storage battery module cannot be executed.

When it is determined in step S5 that the module balancing can be executed, the process proceeds to step S6, and when it is determined in step S5 that the module balancing cannot be executed, the process proceeds to step S7.

In step S6, the controller 100 transmits, to the inter-module balancing unit MB, an instruction to allow the inter-module balancing unit MB to execute the module balancing. The inter-module balancing unit MB that has received the instruction starts module balancing of the corresponding storage battery module unit among the storage battery module units MU1 to MUn. On the other hand, in step S7, the controller 100 transmits, to the inter-module balancing unit MB, an instruction to prohibit the inter-module balancing unit MB to execute the module balancing. The inter-module balancing unit MB that has received the instruction ends the module balancing of the corresponding storage battery module unit among the storage battery module units MU1 to MUn. The end of the module balancing of the storage battery module units MU1 to MUn in step S7 includes a case where the module balancing of the storage battery module units MU1 to MUn is ended without being started. The process proceeds from step S6 and step S7 to step S8.

In step S8, the controller 100 determines whether the cell balancing in each of the storage battery modules M1 to Mm executed by the inter-cell balancing unit CB and the module balancing in each of the storage battery module units MU1 to MUn executed by the inter-module balancing unit MB are completed. If the determination is no in step S8, the process proceeds to step S1, and if the determination is yes in step S8, the process ends.

As described above, in the storage battery string 2 in the power storage system 1 of the present embodiment, the plurality of storage battery module units MU1 to MUn are connected in series, and each of the storage battery module units MU1 to MUn is switched between a bypass state and a connection state by the bypass circuit B. In the storage battery string 2, each of the storage battery module units MU1 to MUn includes the plurality of storage battery modules M1 to Mm connected in series. Each of the storage battery modules M1 to Mm includes the plurality of storage battery cells C1 to Cp connected in series.

That is, in the power storage system 1 of the present embodiment, each of the storage battery module units MU1 to MUn which is switched between the bypass state and the connection state by the bypass circuit B includes the plurality of storage battery modules M1 to Mm connected in series, but not one storage battery module. Accordingly, when the number of connected storage battery modules is increased in order to increase the voltage of the storage battery string 2, a rate of increase in the number of bypass circuits B can be reduced relative to a rate of increase in the number of connected storage battery modules.

Here, in a case where there is a difference in the deterioration state among the plurality of storage battery modules M1 to Mm in each of the storage battery module units MU1 to MUn, one of the most deteriorated storage battery modules M1 to Mm reaches the full charge or the full discharge earlier. Accordingly, the plurality of storage battery module units MU1 to MUn including the corresponding storage battery module are bypassed by the bypass circuits B in a state where other storage battery modules other than the corresponding storage battery module among the storage battery modules M1 to Mm each have a surplus battery capacity. Therefore, the usable battery capacity of the storage battery string 2 cannot be increased by an amount corresponding to the increase in the number of connected storage battery modules M1 to Mm.

In the power storage system 1 of the present embodiment, not only the cell balancing for equalizing the cell voltages of the storage battery cells C1 to Cp in each of the storage battery modules M1 to Mm but also the module balancing for equalizing the module voltages of the storage battery modules M1 to Mm in each of the storage battery module units MU1 to MUn are executed. Accordingly, not only a decrease in the usable battery capacity of each of the storage battery modules M1 to Mm caused by the difference in the cell voltage among the storage battery cells C1 to Cp can be prevented, but also a decrease in the usable battery capacity of each of the storage battery module units MU1 to MUn caused by the difference in the module voltage among the storage battery modules M1 to Mm can be prevented. Accordingly, an increase in the number of bypass circuits B associated with an increase in the number of connected storage battery modules M1 to Mm can be prevented, and the usable battery capacity of the storage battery string 2 can be increased corresponding to the increase in the number of connected storage battery modules M1 to Mm.

In the power storage system 1 of the present embodiment, when the inter-module balancing unit MB includes an active module balancing circuit, the controller 100 executes the cooperative control on the inter-module balancing unit MB and the inter-cell balancing unit CB. Specifically, in a case where one of the storage battery cells C1 to Cp having reached charge termination voltage is included in one of the storage battery modules M1 to Mm which has a relatively low voltage during charging, the controller 100 prohibits the module balancing circuit to transmit power to the corresponding one of the storage battery modules M1 to Mm. Accordingly, the storage battery cells C1 to Cp at the charge termination voltage can be prevented from being overcharged during execution of the module balancing.

Further, in a case where one of the storage battery cells C1 to Cp having reached the discharge termination voltage is included in one of the storage battery modules M1 to Mm which has a relatively high voltage during discharging, the controller 100 prohibits the module balancing circuit to transmit power from the corresponding one of the storage battery modules M1 to Mm. Accordingly, the storage battery cells C1 to Cp at the discharge termination voltage can be prevented from being over-discharged during execution of the module balancing.

Further, during charging, in a case where the input current or the input power of one of the storage battery modules M1 to Mm which has a relatively low voltage is equal to or higher than the limit value, the controller 100 prohibits the module balancing circuit to transmit power to the corresponding one of the storage battery modules M1 to Mm. Accordingly, a current or power exceeding the limit value can be prevented from being input to the storage battery modules M1 to Mm during execution of the module balancing.

Further, in a case where the output current or the output power of one of the storage battery modules M1 to Mm which has a relatively high voltage is equal to or higher than the limit value, the controller 100 prohibits the module balancing circuit to transmit power from the corresponding one of the storage battery modules M1 to Mm. Accordingly, a current or power exceeding the limit value can be prevented from being output from the storage battery modules M1 to Mm during execution of the module balancing.

Although the present disclosure has been described above based on the above embodiment, the present disclosure is not limited to the above embodiment, and modifications may be made without departing from the gist of the present disclosure, and publicly known or well-known techniques may be appropriately combined.

For example, in the above-described embodiment, the storage battery module units MU1 to MUn are continuously charged or discharged unit being fully charged or fully discharged, and the storage battery module units MU1 to MUn which are fully charged or fully discharged are sequentially bypassed. However, the storage battery module units MU1 to MUn may be charged or discharged intermittently by being set to the bypass state or the connection state before being fully charged or fully discharged. In this case, charging or discharging may be executed while changing a combination of those in the bypass state and those in the connection state among the storage battery module units MU1 to MUn.

Here, the feature of the embodiments of the power storage system according to the present disclosure described above are briefly summarized with reference signs.

A first aspect of the present disclosure, a power storage system includes a plurality of storage battery units (MU1 to MUn) connected in series, and a plurality of bypass circuits (B) respectively provided for the storage battery units (MU1 to MUn) and each configured to switch the corresponding storage battery unit between a bypass state and a connection state. Each of the storage battery units (MU1 to MUn) includes a plurality of storage battery modules (M1 to Mm) connected in series, each of the storage battery modules (M1 to Mm) includes a plurality of storage battery cells (C1 to Cp) connected in series. The storage battery modules (M1 to Mm) are respectively provided with inter-cell balancing units (CB) each configured to execute cell balancing for equalizing voltages of the plurality of storage battery cells (C1 to Cp) in the corresponding storage battery module, and the storage battery units (MU1 to MUn) are respectively provided with inter-module balancing units (MB) each configured to execute module balancing for equalizing voltages of the plurality of storage battery modules (M1 to Mm) in the corresponding storage battery unit.

A second aspect of the present disclosure, the power storage system further includes a control unit (100) configured to control the plurality of inter-cell balancing units (CB) and the plurality of inter-module balancing units (MB). Each of the inter-module balancing units (MB) includes an active module balancing circuit configured to transmit power from one of the storage battery modules which has a relatively high voltage to one of the storage battery modules which has a relatively low voltage.

A third aspect of the present disclosure, when the storage battery module having the relatively low voltage includes one of the storage battery cells (C1 to Cp) reaching a charge termination voltage, the control unit (100) prohibits the module balancing circuit from transmitting power to the storage battery module having the relatively low voltage.

A fourth aspect of the present disclosure, when the storage battery module having the relatively high voltage includes one of the storage battery cells (C1 to Cp) reaching a discharge termination voltage, the control unit (100) prohibits the module balancing circuit from transmitting power from the storage battery module having the relatively high voltage.

A fifth aspect of the present disclosure, when a limit value of an input current or input power of the storage battery module having the relatively low voltage is equal to or less than a threshold value, the control unit (100) prohibits the module balancing circuit from transmitting power to the storage battery module having the relatively low voltage.

A sixth aspect of the present disclosure, when a limit value of an output current or output power of the storage battery module having the relatively high voltage is equal to or less than a threshold value, the control unit (100) prohibits the module balancing circuit from transmitting power from the storage battery module having the relatively high voltage.

What is claimed is:

1. A power storage system comprising:
a plurality of storage battery units connected in series; and
a plurality of bypass circuits respectively provided for the storage battery units and each configured to switch the corresponding storage battery unit between a bypass state and a connection state, wherein
each of the storage battery units includes a plurality of storage battery modules connected in series,
each of the storage battery modules includes a plurality of storage battery cells connected in series,
the storage battery modules are respectively provided with inter-cell balancing units each configured to execute cell balancing for equalizing voltages of the plurality of storage battery cells in the corresponding storage battery module, and
the storage battery units are respectively provided with inter-module balancing units each configured to execute module balancing for equalizing voltages of the plurality of storage battery modules in the corresponding storage battery unit.

2. The power storage system according to claim 1, further comprising:
a control unit configured to control the plurality of inter-cell balancing units and the plurality of inter-module balancing units, wherein
each of the inter-module balancing units includes an active module balancing circuit configured to transmit power from one of the storage battery modules which has a relatively high voltage to one of the storage battery modules which has a relatively low voltage.

3. The power storage system according to claim 2, wherein
when the storage battery module having the relatively low voltage includes one of the storage battery cells reaching a charge termination voltage, the control unit prohibits the module balancing circuit from transmitting power to the storage battery module having the relatively low voltage.

4. The power storage system according to claim 2, wherein
when the storage battery module having the relatively high voltage includes one of the storage battery cells reaching a discharge termination voltage, the control unit prohibits the module balancing circuit from transmitting power from the storage battery module having the relatively high voltage.

5. The power storage system according to claim 2, wherein
when a limit value of an input current or input power of the storage battery module having the relatively low voltage is equal to or less than a threshold value, the control unit prohibits the module balancing circuit from transmitting power to the storage battery module having the relatively low voltage.

6. The power storage system according to claim 2, wherein when a limit value of an output current or output power of the storage battery module having the relatively high voltage is equal to or less than a threshold value, the control unit prohibits the module balancing circuit from transmitting power from the storage battery module having the relatively high voltage.

5

\* \* \* \* \*